United States Patent
Rauscher et al.

(10) Patent No.: US 12,553,959 B2
(45) Date of Patent: Feb. 17, 2026

(54) SENSING SYSTEM HAVING A MEMS NITROGEN VACANCY SENSING DEVICE AND RELATED METHODS

(71) Applicant: EAGLE TECHNOLOGY, LLC, Melbourne, FL (US)

(72) Inventors: Scott Rauscher, Washington, DC (US); Haley Stumvoll, West Melbourne, FL (US); James Drakes, Occoquan, VA (US); Fraser R. Dalgleish, Vero Beach, FL (US); Donna M. Kocak, Satellite Beach, FL (US); Nicholas Alban, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 207 days.

(21) Appl. No.: 18/495,019

(22) Filed: Oct. 26, 2023

(65) Prior Publication Data

US 2025/0138111 A1    May 1, 2025

(51) Int. Cl.
*G01R 33/032*    (2006.01)
*B81B 7/02*    (2006.01)
*G01R 33/00*    (2006.01)
*G01R 33/26*    (2006.01)

(52) U.S. Cl.
CPC .............. *G01R 33/032* (2013.01); *B81B 7/02* (2013.01); *G01R 33/0052* (2013.01); *G01R 33/26* (2013.01); *B81B 2201/0271* (2013.01)

(58) Field of Classification Search
CPC .. G01R 33/032; G01R 33/0052; G01R 33/26; G01R 33/0286; B81B 7/02; B81B 2201/0271

(Continued)

(56) References Cited

U.S. PATENT DOCUMENTS 10,347,834 B2    7/2019    Thomas et al.
11,015,264 B2    5/2021    Shimizu
(Continued)

FOREIGN PATENT DOCUMENTS

CN    110289313    9/2019
CN    110975760    4/2020
(Continued)

OTHER PUBLICATIONS

Chen et al., "High-precision gravimeter based on a nano-mechanical resonator hybrid with an electron spin", School of Physics, Peking University, Jul. 2018, pp. 1-7.
(Continued)

*Primary Examiner* — Christopher P McAndrew
(74) *Attorney, Agent, or Firm* — ALLEN, DYER, DOPPELT, GILCHRIST, P.A. Attorneys at Law

(57) ABSTRACT

A sensing system may include a microelectromechanical system (MEMS) device that may include a MEMS substrate having a resonator cavity formed therein, at least one MEMS resonator beam carried by the MEMS substrate within the resonator cavity, and a diamond layer carried by the substrate above the resonator cavity. The diamond layer may include at least one nitrogen vacancy center (NVC) aligned with the at least one MEMS resonator beam. A resonator drive circuit may be coupled to drive the at least one MEMS resonator beam. A sensing circuit may be associated with the at least one nitrogen vacancy center to infer small changes in a magnetic field acceleration from phase perturbations in local magnetic field resonance.

26 Claims, 4 Drawing Sheets

(58) Field of Classification Search
USPC .......................................................... 324/200
See application file for complete search history.

(56) References Cited

U.S. PATENT DOCUMENTS

| | | | | |
|---|---|---|---|---|
| 11,536,897 | B1* | 12/2022 | Thompson | G06N 10/40 |
| 11,733,321 | B2* | 8/2023 | Rosenfeld | G01R 33/323 |
| | | | | 600/409 |
| 2019/0018075 | A1* | 1/2019 | Manickam | G01N 21/64 |
| 2020/0365464 | A1* | 11/2020 | Sreenivasan | H10D 84/85 |
| 2021/0103010 | A1* | 4/2021 | Rosenfeld | G01R 33/24 |

FOREIGN PATENT DOCUMENTS

| | | |
|---|---|---|
| CN | 110243501 | 12/2020 |
| DE | 102019104182 | 9/2019 |
| JP | 7070904 | 5/2022 |
| KR | 102458001 | 10/2022 |
| WO | 2022097822 | 5/2022 |

OTHER PUBLICATIONS

Chen et al., "Orbital state manipulation of a diamond nitrogen-vacancy center using a mechanical resonator", APS Phys. Rev. Lett 120, Apr. 2018, pp. 1-7.

Rabl et al., "Strong magnetic coupling between an electronic spin qubit and a mechanical resonator", APS Phys. Rev., Jan. 2009, Abstract Only.

Segura et al., "Diamond-based optical vector magnetometer", IEEE Xplore, 2021, pgs.

* cited by examiner

SENSING SYSTEM HAVING A MEMS NITROGEN VACANCY SENSING DEVICE AND RELATED METHODS

TECHNICAL FIELD

The present disclosure relates to sensing systems, and, more particularly, to a sensing system using a microelectromechanical system (MEMS) nitrogen vacancy sensing device and associated methods.

BACKGROUND

A nitrogen vacancy center (NVC) in diamond is a promising platform for many applications in quantum technologies. The atom-like energy level structure of the nitrogen vacancy center makes it a vector magnetometer at subnanotesla spatial scales for measuring one or more components of a magnetic field.

A useful property of the nitrogen vacancy center is its photoluminescence, which allows observers to read out its spin-state. Full state control in the nitrogen vacancy center spin manifold has been realized through several techniques, including magnetic, optical and mechanical methods. In contrast, manipulation of a nitrogen vacancy center within its excited-state orbital manifold is less explored.

One approach is provided in an article titled "Orbital State Manipulation of a Diamond Nitrogen-Vacancy Center Using a Mechanical Resonator" by Chen et al. The device uses resonant optical transitions of a single nitrogen vacancy center that is coherently dressed by a strong mechanical drive. A gigahertz-frequency diamond mechanical resonator is strain-coupled to the nitrogen vacancy center's orbital states to provide orbital-phonon interactions that may be spectroscopically revealed as a function of resonator driving amplitude. Nonetheless, further improvements in using a nitrogen vacancy center and a mechanical resonator are desired.

SUMMARY

A sensing system includes a microelectromechanical system (MEMS) device that may include a MEMS substrate having a resonator cavity formed therein, at least one MEMS resonator beam carried by the MEMS substrate within the resonator cavity, and a diamond layer carried by the substrate above the resonator cavity. The diamond layer may include at least one nitrogen vacancy center (NVC) aligned with the at least one MEMS resonator. A resonator drive circuit may be coupled to drive the at least one MEMS resonator beam. A sensing circuit may be associated with the at least one nitrogen vacancy center to detect changes in a magnetic field.

The MEMS substrate may include a Silicon-On-Insulator (SOI) MEMS substrate. The MEMS substrate may include a silicon layer and at least one spacer between the silicon layer and the diamond layer.

The at least one MEMS resonator beam may include a conductive silicon layer and a ferromagnetic body carried thereby. The at least one spacer may define a gap between the at least one nitrogen vacancy center and the ferromagnetic body within a range of 50-500 nm.

The diamond layer may be a rigid diamond plate. The sensing system may include a pair of wire bonding pads carried by the MEMS substrate and coupled to the resonator drive circuit.

The sensing system may include a radio frequency (RF) excitation source coupled to the at least one nitrogen vacancy center.

The sensing circuit may include an optical excitation source coupled to the at least one nitrogen vacancy center, and an optical detector coupled to the at least one nitrogen vacancy center. The optical excitation source may provide light having a first wavelength to the at least one nitrogen vacancy center. The optical detector may receive light having a second wavelength emitted by the at least one nitrogen vacancy center in response to the at least one nitrogen vacancy center absorbing the light having the first wavelength.

The sensing system may include a first interface between the optical excitation source and the at least one nitrogen vacancy center, and a second interface between the optical detector and the at least one nitrogen vacancy center. The respective first and second interfaces may be at least one of free space, optical fibers and waveguides.

Another aspect is directed to a microelectromechanical system (MEMS) device that may include a MEMS substrate having a resonator cavity formed therein, at least one MEMS resonator beam carried by the MEMS substrate within the resonator cavity, and a diamond layer carried by the MEMS substrate above the resonator cavity. The diamond layer may include at least one nitrogen vacancy center (NVC) aligned with the at least one MEMS resonator.

Yet another aspect is directed to a method for making a microelectromechanical system (MEMS) device as described above. The method may include forming a resonator cavity within a MEMS substrate, and forming at least one MEMS resonator beam carried by the MEMS substrate within the resonator cavity. A diamond layer may be coupled to the MEMS substrate above the resonator cavity. The diamond layer may include at least one nitrogen vacancy center (NVC) aligned with the at least one MEMS resonator.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
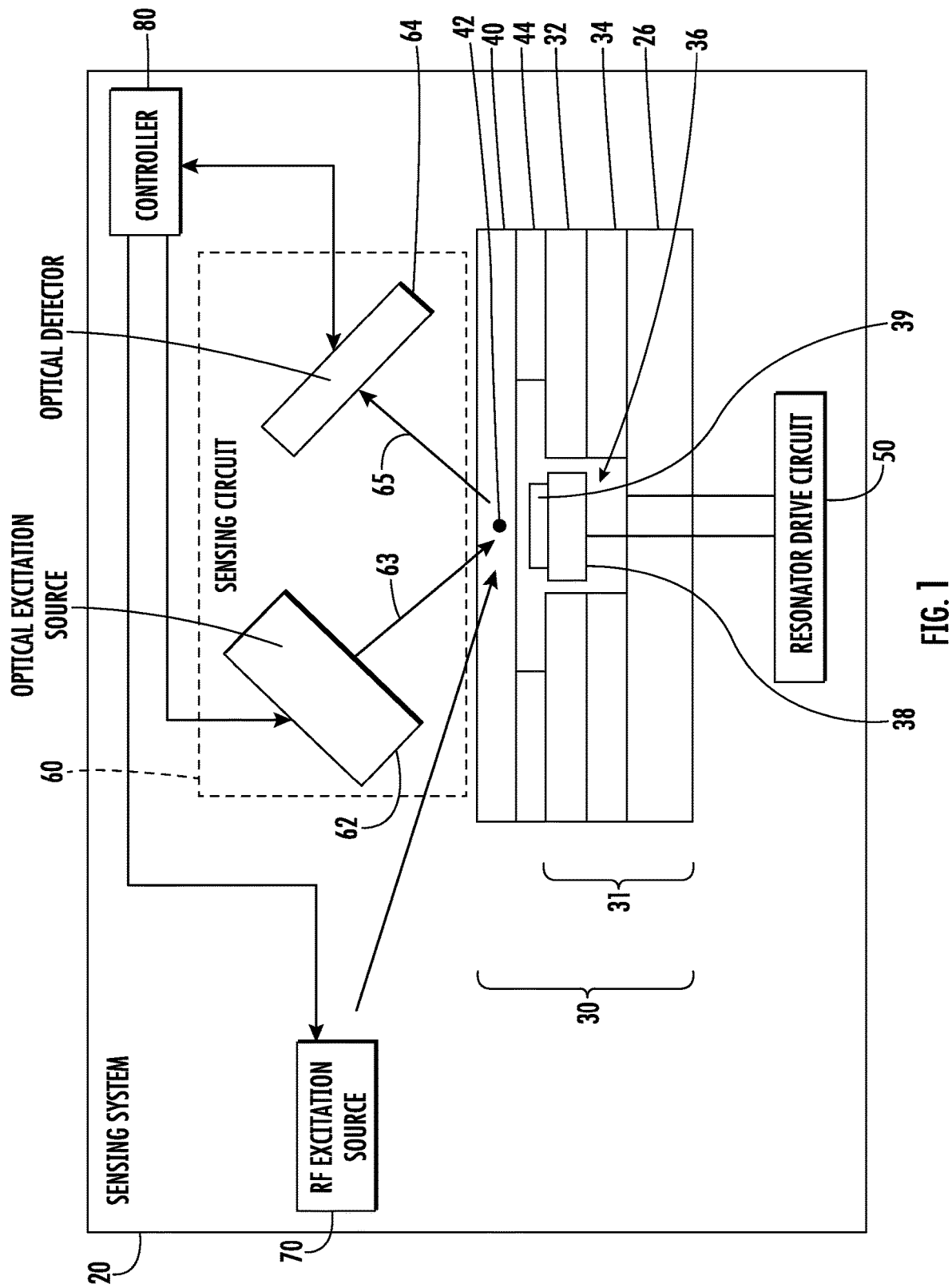
FIG. 1 is a schematic diagram of a sensing system that includes a MEMs device with a diamond layer having at least one nitrogen vacancy center (NVC) in which various aspects of the disclosure may be implemented.

Referring initially to FIG. 1, a sensing system 20 includes a microelectromechanical system (MEMS) device 30 with a diamond layer 40 having at least one nitrogen vacancy center (NVC) 42 configured to detect changes in phase perturbations in local magnetic field resonance. The sensing system 20 may be carried by a terrestrial, airborne or space-based (e.g., a satellite) vehicle, for example.

The MEMS device 30 includes a MEMS substrate 31 having a resonator cavity 36 formed therein and at least one MEMS resonator beam 38 carried by the MEMS substrate within the resonator cavity. The diamond layer 40 is carried by the MEMS substrate 31 above the resonator cavity 36. The at least one nitrogen vacancy center 42 in the diamond layer 40 is aligned with the at least one MEMS resonator beam 38.

The MEMS device 30 is advantageously formed using semiconductor microfabrication and photolithography techniques. The MEMS substrate 31 is a Silicon-On-Insulator (SOI) wafer that includes a silicon layer 32 on an insulator layer 34. The MEMS substrate 31 further includes a silicon handle layer 26 to carry the silicon layer 32 and the insulator layer 34. The at least one MEMS resonator beam 38 is part of the silicon layer 32, with a ferromagnetic body 39 carried thereby. Spacers 44 are formed on the silicon layer 32 to receive the diamond layer 40 so that the nitrogen vacancy center (NVC) 42 is precisely spaced from the ferromagnetic body 39. The MEMS device 30 with the diamond layer 40 provides a chip-level configuration that is solid-state and compact in size.

One embodiment of the MEMS device 30 may include 2 or more MEMS resonator beams 38 in the resonator cavity 36 while the diamond layer 40 includes a single nitrogen vacancy center 42. Another embodiment of the MEMS device 30 may include a single MEMS resonator beam 38 in the resonator cavity 36 while the diamond layer 40 includes 2 or more nitrogen vacancy centers 42.

In the illustrated embodiment, the MEMS device 30 will be discussed as having a single MEMS resonator beam 38 in the resonator cavity 36, and a single nitrogen vacancy center 42 in the diamond layer 40. A resonator drive circuit 50 is coupled to drive the MEMS resonator beam 38. The resonator drive circuit 50 causes the MEMS resonator beam 38 to oscillate within the cavity 36. The frequency of oscillation is at the natural resonant frequency of the MEMS resonator beam 38, which may be in the KHz to MHz range.

The MEMS resonator beam 38 includes a conductive silicon layer and a ferromagnetic tip 39 on the conductive silicon layer. The ferromagnetic tip 39 is aligned with the nitrogen vacancy center 42. The nitrogen vacancy center 42 is sensitive to variations in the magnetic field associated with the ferromagnetic tip 39. Detecting changes in the magnetic field is well suited for many applications in quantum technologies. The sensing system 20 may be used as a magnetometer or as an accelerometer, for example.

The nitrogen vacancy center 42 is a point defect in the diamond layer 40. This point defect includes a nearest-neighbor pair of a nitrogen atom, which substitutes for a carbon atom, and a diamond lattice vacancy. The nitrogen vacancy center 42 has a neutral charge state or a negative charge state, and has four orientations, with each orientation corresponding to a different crystallographic orientation of the diamond lattice. The nitrogen vacancy center 42 also has rotational symmetry, with one ground state $m_s=0$ and two spin states $m_s=\pm 1$. In the absence of an external magnetic field, the $m_s=\pm 1$ energy levels are offset from the $m_s=0$ ground state due to spin-spin interactions.

A sensing circuit 60 is coupled to the diamond layer 40. The sensing circuit 60 includes an optical excitation source 62 and an optical detector 64. The optical excitation source 62 may be a laser or a light emitting diode, for example. The optical excitation source 62 generates green light (wavelength 520-565 nm) that is directed towards the nitrogen vacancy center 42. The interface 63 between the optical excitation source 62 and the diamond layer 40 may be free space, an optical fiber or a waveguide.

The green light induces fluorescence in the nitrogen vacancy center 42 which causes red light (wavelength 630-800 nm) to be emitted. This wavelength covers the red to near infrared (NIR) bands. Fuorescence is the emission of light having a longer wavelength (red) by the nitrogen vacancy center 42 in response to the nitrogen vacancy center 42 having absorbed the light (green) from the optical excitation source 62. The red light is received by the optical detector 64 to be analyzed at the molecular level. The interface 65 between the diamond layer 40 and the optical detector 64 may be free space, an optical fiber or a waveguide.

The optical detector 64 uses intensity of the fluorescence to measure phase perturbations in local magnetic field resonance. The fluorescence corresponds to electronic transitions between an excited spin state and the ground state of the nitrogen vacancy center 42. The optical detector 64 is an optoelectronic device that converts the red light into electrical signals. The optical detector 64 may be a photodiode or a phototransistor, for example, and distinguishes the $m_s=\pm 1$ spin states, and measures the local (e.g., MEMS resonator with ferromagnetic tip induced) resonant magnetic field and phase perturbations thereof based on the energy difference between the $m_s=+1$ spin state and the $m_s=-1$ spin state.

The sensing system 20 further includes a radio frequency (RF) excitation source 70 to provide RF radiation to the nitrogen vacancy center 42. The RF excitation source 70, for example, may be a transmitter with an antenna coupled to the transmitter. The RF excitation source 70 is configured to emit RF radiation with a photon energy resonant with the transition energy between the different spin states of the nitrogen vacancy center 42. A transmit frequency of 2.87 GHz excites transitions between the $m_s=0$ ground state and $m_s=+1$ spin states, and between the $m_s=0$ ground state and $m_s=-1$ spin states.

The sensing system 20 includes a controller 80 to receive an output of the optical detector 64. The controller 80 also controls the optical excitation source 62 and the RF excitation source. For continuous wave excitation, the optical excitation source 62 continuously pumps the nitrogen vacancy center 42, and the RF excitation source 70 transmits at the 2.87 GHz frequency so that the spin states of the nitrogen vacancy center 42 resonate.

Figure 2:
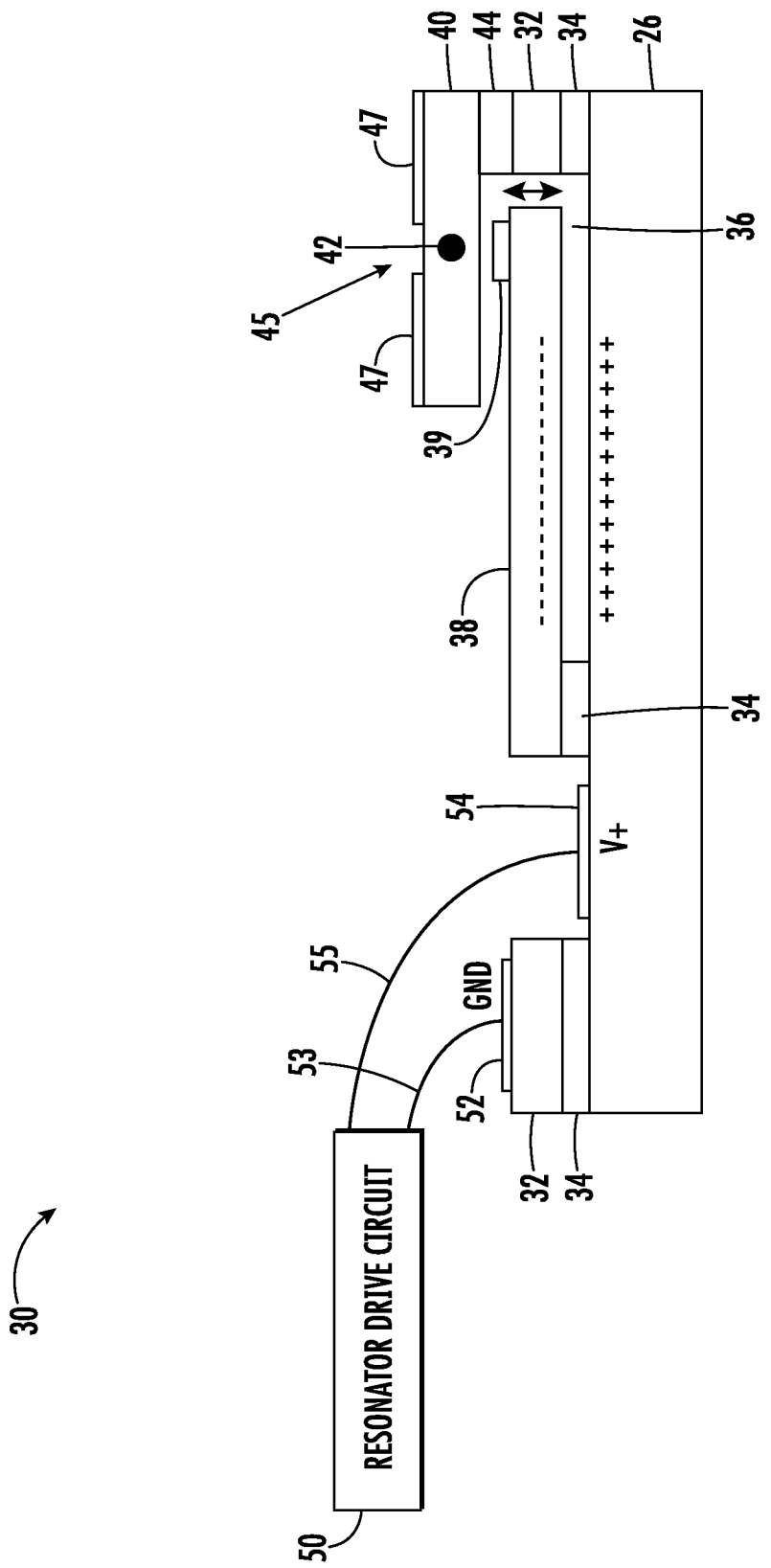
FIG. 2 is a partial schematic diagram of a side view of the MEMS device illustrated in FIG. 1.

Referring now to FIG. 2, a partial side view of the MEMS device 30 illustrated in FIG. 1 shows that the MEMS resonator beam 38 is fixed at one end to a portion of the oxide layer 34 to form a cantilever beam. In other embodiments, the beam 38 is fixed at both ends by respective spaced apart portions of the oxide layer 34.

A wire bonding pad 52 is formed on the silicon device layer 32, and a wire bonding pad 54 is formed on the silicon handle layer 26. The resonator drive circuit 50 is coupled to the wire bonding pads 52, 54 via wire bonds 53, 55. A voltage is applied to the silicon handle layer 26 and ground is applied to the silicon layer 32.

When the sensing device 20 is configured as an accelerometer, for example, an alternating volage is applied to the wire bonding pads 52, 54. This causes the MEMS resonator beam 38 to oscillate at a fixed frequency within the cavity 36. When the sensing device 20 is configured as a magnetometer, for example, a fixed voltage is applied to the wire bonding pads 52, 54. This causes the MEMS resonator beam 38 to be pulled towards the silicon handle layer 26.

The ferromagnetic body 39 formed on the MEMS resonator beam 38 may be titanium/gold or chrome/gold, for example. At least one spacer 44 is formed on the silicon layer 32. The spacer 44 receives the diamond layer 40, which may be configured as a rigid diamond plate 40. An example size of the rigid diamond plate 40 is 3×3 mm. The spacer 44 offsets the nitrogen vacancy center 42 with nanometer precision from the ferromagnetic body 39. The spacer 44 defines this offset (i.e., gap) within a range of 50-500 nm, for example. The closest peak of the resonating ferromagnetic body 39 to the nitrogen vacancy center 42 is 100 nm.

The rigid diamond plate 40 is placed on the spacer 44 so that the nitrogen vacancy center 42 is aligned with the ferromagnetic body 39. There is no electrical connection between the nitrogen vacancy center 42 and the rigid diamond plate 40. Instead, the rigid diamond plate 40 contains one or more nitrogen vacancy centers 42. The nitrogen vacancy centers 42 in the rigid diamond plate 40 are coupled to the MEMS resonator beam 38 via the ferromagnetic material deposited on the tip 39 of the MEMS resonator beam 38. Variations of phase perturbations in local magnetic field resonance associated with the ferromagnetic tip 39 is detected by the nitrogen vacancy center 42. If the rigid diamond plate 40 includes multiple nitrogen vacancy centers 42, for example, then a window 45 defined by a window layer 47 formed on the rigid diamond plate 40 may be used to isolate a particular nitrogen vacancy center 42. The window border layer 47 may be gold, for example.

Figure 3:
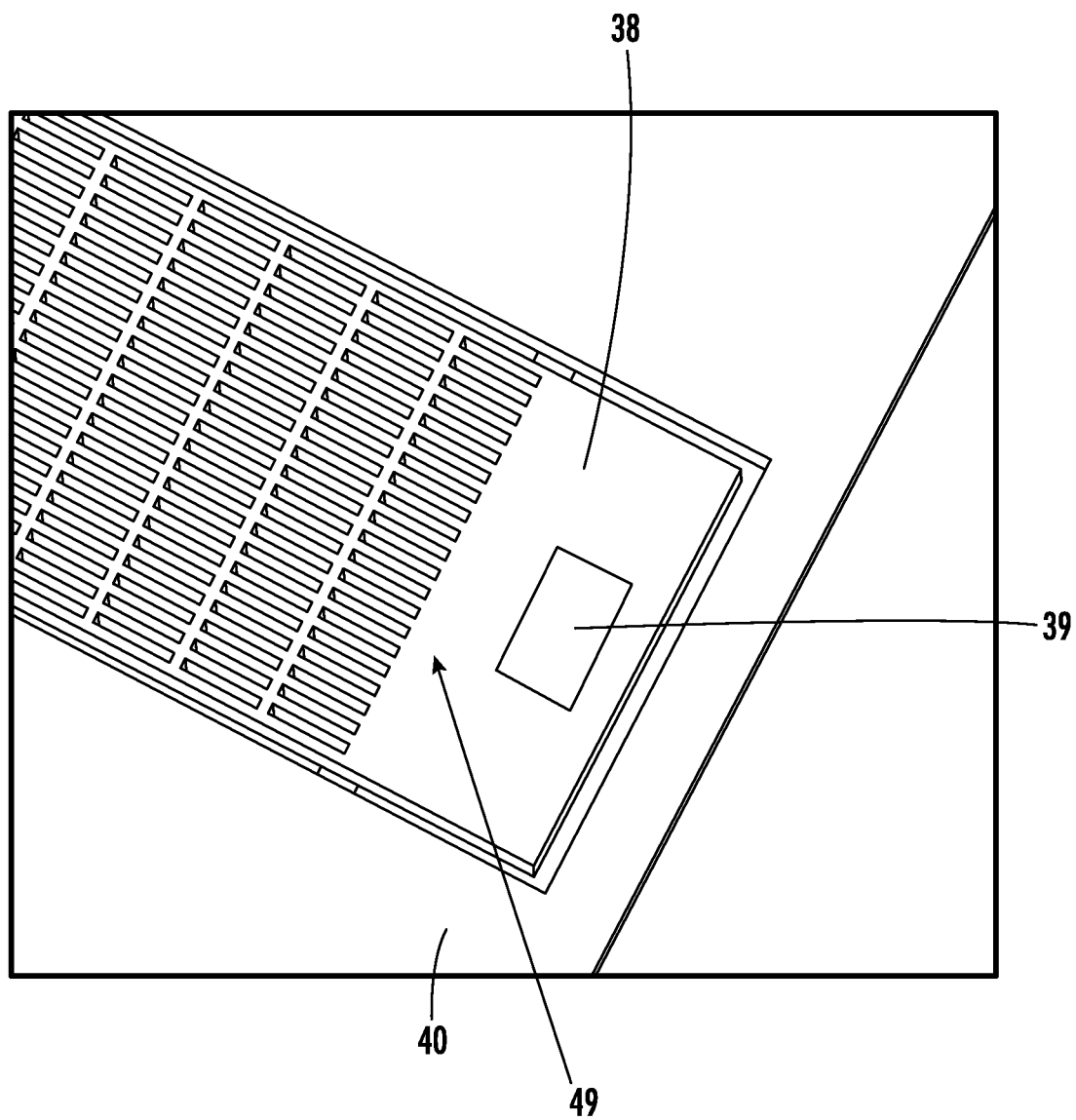
FIG. 3 is a partial top perspective view of the MEMS resonator beam illustrated in FIG. 1 without the diamond layer in place.

The MEMS resonator beam 38 may be configured to include a plurality of spaced apart slits or openings 49 extending through an area of the MEMS resonator beam 38, as shown in FIG. 3. The slits or openings 49 may be used to define the elasticity value K of the oscillating MEMS resonator beam 38. The elasticity value K indicates stiffness and strength of the MEMS resonator beam 38, and effects the natural resonant frequency of the MEMS resonator beam 38. The slits or openings 49 may also be used to enable hydrofluoric (HF) vapor gas to flow underneath the MEMS resonator beam 38 and etch away a buried silicon dioxide layer to create the cavity 36, enabling free movement of the MEMS resonator beam 38.

Figure 4:
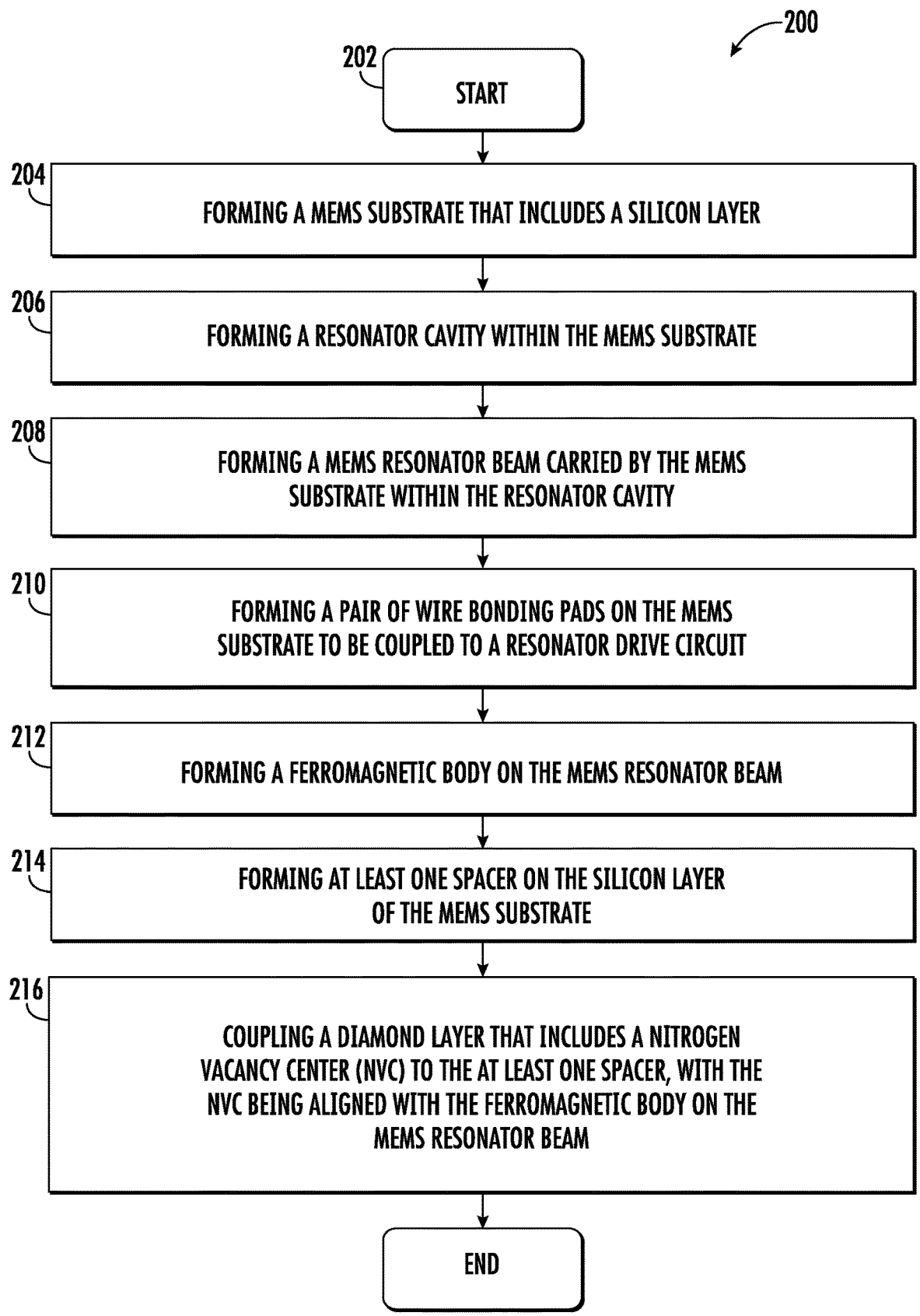
FIG. 4 is a flow diagram on a method for making the MEMS device illustrated in FIG. 1.

Referring now to FIG. 4, a flow diagram 200 on a method for making the MEMS device 30 will be discussed. From the start (Block 202), the method includes forming a MEMS substrate 31 that includes a silicon layer 32 on an oxide layer 34 at Block 204. A resonator cavity 36 is formed within the MEMS substrate 31 at Block 206. A MEMS resonator beam 38 carried by the MEMS substrate 31 is formed within the resonator cavity 36 at Block 208, followed by release of the HF vapor gas as mentioned above.

A pair of wire bonding pads 52, 54 are formed on the MEMS substrate 31 at Block 210. The wire bonding pads 52, 54 are coupled to a resonator drive circuit 70 using wire bonds 53, 55. A ferromagnetic body 39 is formed on the MEMS resonator beam 38 at Block 212. At least one spacer 44 is formed on the silicon layer 32 at Block 214. The method further includes coupling a diamond layer 40 that includes a nitrogen vacancy center (NVC) 42 to the at least one spacer 44 at Block 216. The nitrogen vacancy center 42 is aligned with the ferromagnetic body 39 on the MEMS resonator beam 38. The method ends at Block 218.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A sensing system comprising:
    a microelectromechanical system (MEMS) device comprising
        a MEMS substrate having a resonator cavity formed therein,
        at least one MEMS structural resonator beam carried by the MEMS substrate within the resonator cavity, and
        a diamond layer carried by the MEMS substrate above the resonator cavity and comprising at least one nitrogen vacancy center (NVC) aligned with the at least one MEMS structural resonator beam;
    a resonator drive circuit coupled to drive the at least one MEMS structural resonator beam; and
    a sensing circuit associated with the at least one nitrogen vacancy center.

2. The sensing system of claim 1 wherein the MEMS substrate comprises a Silicon-On-Insulator (SOI) MEMS substrate.

3. The sensing system of claim 1 wherein the MEMS substrate comprises a silicon layer and at least one spacer between the silicon layer and the diamond layer.

4. The sensing system of claim 3 wherein the at least one MEMS structural resonator beam comprises a conductive silicon layer and a ferromagnetic body carried thereby.

5. The sensing system of claim 4 wherein the at least one spacer defines a gap between the at least one nitrogen vacancy center and the ferromagnetic body within a range of 50-500 nm.

6. The sensing system of claim 1 wherein the diamond layer comprises a rigid diamond plate.

7. The sensing system of claim 1 comprising a pair of wire bonding pads carried by the MEMS substrate and coupled to the resonator drive circuit.

8. The sensing system of claim 1 comprising a radio frequency (RF) excitation source coupled to the at least one nitrogen vacancy center.

9. The sensing system of claim 1 wherein the sensing circuit comprises:
    an optical excitation source to provide light having a first wavelength coupled to the at least one nitrogen vacancy center; and
    an optical detector to receive light having a second wavelength emitted by the at least one nitrogen vacancy center in response to the at least one nitrogen vacancy center absorbing the light having the first wavelength.

10. The sensing system of claim 9 comprising a first interface between the optical excitation source and the at least one nitrogen vacancy center, and a second interface between the optical detector and the at least one nitrogen vacancy center, with the respective first and second interfaces comprising at least one of free space, optical fibers and waveguides.

11. A microelectromechanical system (MEMS) device comprising:
    a MEMS substrate having a resonator cavity formed therein;
    at least one MEMS structural resonator beam carried by the MEMS substrate within the resonator cavity; and
    a diamond layer carried by the MEMS substrate above the resonator cavity and comprising at least one nitrogen vacancy center (NVC) aligned with the at least one MEMS structural resonator beam.

12. The MEMS device of claim 11 wherein the MEMS substrate comprises a Silicon-On-Insulator (SOI) MEMS substrate.

13. The MEMS device of claim 11 wherein the MEMS substrate comprises a silicon layer and at least one spacer between the silicon layer and the diamond layer.

14. The MEMS device of claim 13 wherein the at least one MEMS structural resonator beam comprises a conductive silicon layer and a ferromagnetic body carried thereby.

15. The MEMS device of claim 14 wherein the at least one spacer defines a gap between the at least one nitrogen vacancy center and the ferromagnetic body within a range of 50-500 nm.

16. The MEMS device of claim 11 wherein the diamond layer comprises a rigid diamond plate.

17. The MEMS device of claim 11 comprising a pair of wire bonding pads carried by the MEMS substrate to be coupled to a resonator drive circuit.

18. A method for making a microelectromechanical system (MEMS) device comprising:
   forming a resonator cavity within a MEMS substrate;
   forming at least one MEMS structural resonator beam carried by the MEMS substrate within the resonator cavity; and
   coupling a diamond layer to the MEMS substrate above the resonator cavity and comprising at least one nitrogen vacancy center (NVC) aligned with the at least one MEMS structural resonator beam.

19. The method of claim 18 wherein the MEMS substrate comprises a Silicon-On-Insulator (SOI) MEMS substrate.

20. The method of claim 18 wherein the MEMS substrate comprises a silicon layer and at least one spacer between the silicon layer and the diamond layer.

21. The method of claim 20 wherein the at least one MEMS structural resonator beam comprises a conductive silicon layer and a ferromagnetic body carried thereby.

22. The method of claim 21 wherein the at least one spacer defines a gap between the at least one nitrogen vacancy center and the ferromagnetic body within a range of 50-500 nm.

23. The method of claim 18 wherein the diamond layer comprises a rigid diamond plate.

24. A microelectromechanical system (MEMS) device comprising:
   a MEMS substrate having a resonator cavity formed therein;
   at least one MEMS resonator beam carried by the MEMS substrate within the resonator cavity, the at least one resonator beam comprising a conductive silicon layer and a ferromagnetic body carried thereby; and
   a diamond layer carried by the MEMS substrate above the resonator cavity and comprising at least one nitrogen vacancy center (NVC) aligned with the at least one MEMS resonator beam.

25. The MEMS device of claim 24 wherein the MEMS substrate comprises a Silicon-On-Insulator (SOI) MEMS substrate.

26. The MEMS device of claim 24 wherein the MEMS substrate comprises a silicon layer and at least one spacer between the silicon layer and the diamond layer.

* * * * *